United States Patent [19]

Davis

[11] 4,191,659
[45] * Mar. 4, 1980

[54] SULFURIZED COMPOSITIONS

[75] Inventor: Kirk E. Davis, Euclid, Ohio

[73] Assignee: The Lubrizol Corporation, Wickliffe, Ohio

[*] Notice: The portion of the term of this patent subsequent to Oct. 10, 1995, has been disclaimed.

[21] Appl. No.: 949,286

[22] Filed: Oct. 6, 1978

Related U.S. Application Data

[63] Continuation-in-part of Ser. No. 814,573, Jul. 11, 1977, Pat. No. 4,119,549, which is a continuation-in-part of Ser. No. 666,546, Mar. 15, 1976, abandoned, which is a continuation-in-part of Ser. No. 560,675, Mar. 21, 1975, abandoned.

[51] Int. Cl.$^2$ .................. C10M 1/38; C10M 3/32; C07G 17/00
[52] U.S. Cl. .......................................... 252/45; 72/42; 252/406; 260/125; 260/139
[58] Field of Search ..................... 252/45, 406; 72/42; 260/139, 125, 399

[56] References Cited

U.S. PATENT DOCUMENTS

| 2,337,473 | 12/1943 | Knowles et al. | 252/45 |
| 2,910,462 | 10/1959 | Sabol | 252/45 |
| 3,419,614 | 12/1968 | Doss | 260/139 |

FOREIGN PATENT DOCUMENTS

| 453921 | 9/1936 | United Kingdom | 252/45 |
| 1278188 | 6/1972 | United Kingdom | 252/45 |

Primary Examiner—Irving Vaughn
Attorney, Agent, or Firm—James W. Adams, Jr.; William H. Pittman

[57] ABSTRACT

Sulfurized compositions are prepared by the reaction, under superatmospheric pressure, of olefinic compounds with a mixture of sulfur and hydrogen sulfide in the presence of an acidic, basic or neutral catalyst, followed by removal of low boiling materials including unreacted olefin, mercaptan and monosulfide. An optional final step is removal of active sulfur; for example, by treatment with an alkali metal sulfide. The resulting sulfurized compositions are useful as lubricant additives.

45 Claims, No Drawings

SULFURIZED COMPOSITIONS

REFERENCE TO RELATED APPLICATIONS

This application is a continuation-in-part of my copending application Ser. No. 814,573, filed July 11, 1977, now U.S. Pat. No. 4,119,549, which application is a continuation-in-part of my earlier copending application Ser. No. 666,546, filed Mar. 15, 1976, which in turn is a continuation-in-part of application Ser. No. 560,675, filed Mar. 21, 1975. The latter two applications are now abandoned.

This invention relates to a method for preparing sulfurized compositions of matter, the sulfurized compositions thus prepared, and lubricants containing those compositions. Briefly described, the method of this invention comprises the steps of reacting, under suitable conditions described in detail hereinafter, sulfur and hydrogen sulfide with at least one olefinic compound to form a sulfurized mixture, and removing from said sulfurized mixture substantially all low boiling materials.

Various compositions prepared by the sulfurization of olefins are known in the art, as are lubricants containing them. Typical sulfurized compositions prepared by reacting such olefins as isobutene, diisobutene and triisobutene with sulfur under various conditions are described in *Chemical Reviews*, 65, 237 (1965), and in *The Chemistry Of Organic Sulfur Compounds*, Vol. II, Chapter 10 (1966). These products are generally characterized by the presence of a trithione grouping. A by-product is hydrogen sulfide, and it is frequently taught that it is desirable to remove the hydrogen sulfide which is formed. Other references describe the reaction of such olefins as isobutene, diisobutene and triisobutene with hydrogen sulfide to form predominantly mercaptans, with sulfides, disulfides and higher polysulfides also being formed as by-products. Reference is made to *J. Am. Chem. Soc.*, 60, 2452 (1938); *J. Chem. Soc*, 1947, 1532; and U.S. Pat. Nos. 3,221,056 and 3,419,614. The latter patent describes a process for increasing the yield of mercaptan by carrying out the reaction of the olefin with hydrogen sulfide and sulfur at a high temperature in the presence of various basic materials.

It is also well known that many sulfurized organic compositions are useful as lubricant additives. The recent development of high performance lubricants has been accompanied by the development of improved multi-purpose lubricant additives, including additives which simultaneously improve extreme pressure properties, reduce wear and inhibit oxidation. For many lubricant applications, the above-described trithione- and mercaptan-containing compositions have not been entirely adequate as multi-purpose additives.

A principal object of this invention, therefore, is to produce a method for preparing improved sulfurized compositions of matter.

A further object is to produce improved sulfurized compositions for use in lubricants as multi-purpose additives, chiefly to improve extreme pressure properties and reduce wear and oxidation.

A further object is to produce sulfurized compositions suitable as lubricant additives which comprise primarily higher sulfides and are relatively free of mercaptans and monosulfides.

Other objects will in part be obvious and will in part appear hereinafter.

The olefinic compounds which may be sulfurized by the method of this invention are diverse in nature. They contain at least one olefinic double bond, which is defined as a non-aromatic double bond; that is, one connecting two aliphatic carbon atoms. In its broadest sense, the olefin may be defined by the formula $R^1R^2C=CR^3R^4$, wherein each of $R^1$, $R^2$, $R^3$ and $R^4$ is hydrogen or an organic radical. In general, the R values in the above formula which are not hydrogen may be satisfied by such groups as $-C(R^5)_3$, $-COOR^5$, $-CON(R^5)_2$, $-COON(R^5)_4$, $-COOM$, $-CN$,

$-X$, $-YR^5$ or $-Ar$, wherein:

Each $R^5$ is independently hydrogen, alkyl, alkenyl, aryl, substituted alkyl, substituted alkenyl or substituted aryl, with the proviso that any two $R^5$ groups can be alkylene or substituted alkylene whereby a ring of up to about 12 carbon atoms is formed;

M is one equivalent of a metal cation (preferably Group I or II, e.g., sodium, potassium, barium, calcium);

X is halogen (e.g., chloro, bromo, or iodo);

Y is oxygen or divalent sulfur;

Ar is an aryl or substituted aryl radical of up to about 12 carbon atoms.

Any two of $R^1$, $R^2$, $R^3$ and $R^4$ may also together form an alkylene or substituted alkylene group; i.e., the olefinic compound may be alicyclic.

The natures of the substituents in the substituted moieties described above are not normally a critical aspect of the invention and any such substituent is useful so long as it is or can be made compatible with lubricating environments and does not interfere under the contemplated reaction conditions. Thus, substituted compounds which are so unstable as to deleteriously decompose under the reaction conditions employed are not contemplated. However, certain substituents such as keto or aldehydo can desirably undergo sulfurization. The selection of suitable substituents is within the skill of the art or may be established through routine testing. Typical of such substituents include any of the above-listed moieties as well as hydroxy, amidine, amino, sulfonyl, sulfinyl, sulfonate, nitro, phosphate, phosphite, alkali metal mercapto and the like.

The olefinic compound is usually one in which each R value which is not hydrogen is independently alkyl, alkenyl or aryl, or (less often) a corresponding substituted radical. Monoolefinic and diolefinic compounds, particularly the former, are preferred, and especially terminal monoolefinic hydrocarbons; that is, those compounds in which $R^3$ and $R^4$ are hydrogen and $R^1$ and $R^2$ are alkyl or aryl, especially alkyl (that is, the olefin is aliphatic). Olefinic compounds having about 3–30 and especially about 3–16 (most often less than 9) carbon atoms are particularly desirable.

Isobutene, propylene and their dimers, trimers and tetramers, and mixtures thereof are especially preferred olefinic compounds. Of these compounds, isobutylene and diisobutylene are particularly desirable because of their availability and the particularly high sulfur-containing compositions which can be prepared therefrom.

The other two reagents which are essential in the method of this invention, sulfur and hydrogen sulfide, are well known and are commercially available. Commercial sources of all these reagents are normally used for the purpose of this invention, and impurities normally associated therewith may be present without adverse results. Thus, commercial diisobutene is believed to contain essentially two isomeric forms and this mixture is contemplated for use according to the present invention.

The amounts of sulfur and hydrogen sulfide per mole of olefinic compound are, respectively, about 0.3–3.0 gram-atoms and about 0.1–1.5 moles. The preferred ranges are about 0.5–2.0 gram-atoms and about 0.4–1.25 moles respectively, and the most desirable ranges are about 1.2–1.8 gram-atoms and about 0.4–0.8 mole respectively. In batch operations, the reactants are introduced at levels to provide these ranges. In semi-continuous and continuous operations, they may be admixed at any ratio but on a mass balance basis, they are present so as to be consumed in amounts within these ratios. Thus, for example, if the reaction vessel is initially charged with sulfur alone, the olefinic compound and hydrogen sulfide are added incrementally at a rate such that the desired ratio is obtained.

The temperature range in which the sulfurization reaction is carried out is generally about 50°–350° C. The preferred range is about 100°–200° C., with about 125°–180° C. being especially suitable. The reaction is conducted under superatmospheric pressure; this may be and usually is autogenous pressure (i.e., the pressure which naturally develops during the course of the reaction) but may also be externally applied pressure. The exact pressure developed during the reaction is dependent upon such factors as the design and operation of the system, the reaction temperature, and the vapor pressure of the reactants and products and it may vary during the course of the reaction.

It is frequently advantageous to incorporate materials useful as sulfurization catalysts in the reaction mixture. These materials may be acidic, basic or neutral. Useful neutral and acidic materials include acidified clays such as "Super Filtrol", p-toluenesulfonic acid, dialkylphosphorodithioic acids, and phosphorus sulfides such as phosphorus pentasulfide.

The preferred catalysts are basic materials. These may be inorganic oxides and salts such as sodium hydroxide, calcium oxide and sodium sulfide. The most desirable basic catalysts, however, are nitrogen bases including ammonia and amines. The amines include primary, secondary and tertiary hydrocarbyl amines wherein the hydrocarbyl radicals are alkyl, aryl, aralkyl, alkaryl or the like and contain about 1–20 carbon atoms. Suitable amines include aniline, benzylamine, dibenzylamine, dodecylamine, naphthylamine, tallow amines, N-ethyldipropylamine, N-phenylbenzylamine, N,N-diethylbutylamine, m-toluidine and 2,3-xylidine. Also useful are heterocyclic amines such as pyrrolidine, N-methylpyrrolidine, piperidine, pyridine and quinoline.

The preferred basic catalysts include ammonia and primary, secondary, or tertiary alkylamines having about 1–8 carbon atoms in the alkyl radicals. Representative amines of this type are methylamine, dimethylamine, trimethylamine, ethylamine, diethylamine, triethylamine, di-n-butylamine, tri-n-butylamine, tri-sec-hexylamine and tri-n-octylamine. Mixtures of these amines can be used, as well as mixtures of ammonia and amines.

The amount of catalytic material used is generally about 0.05–2.0% of the weight of the olefinic compound. In the case of the preferred ammonia and amine catalysts, about 0.0005–0.5 mole per mole of olefin is preferred, and about 0.001–0.1 mole is especially desirable.

Also present in the reaction mixture may be water, either as a catalyst or as a diluent for one or more of the catalysts recited hereinabove. The amount of water, when present, is usually about 1–25% by weight of the olefinic compound. The presence of water is, however, not essential and when certain types of reaction equipment are used it may be advantageous to conduct the reaction under substantially anhydrous conditions.

When catalysts are incorporated into the reaction mixture as described hereinabove it is frequently found that the percentage in the product of compounds containing trithione groups is substantially decreased. Such decrease is advantageous since the presence of trithiones appears to impart color to the product. Also, the product obtained by use of a basic catalyst such as ammonia or an amine frequently has superior long term stability to a similar product obtained without using a catalyst and post-treated as described hereinafter.

The method of this invention is usually carried out in the absence of solvents and diluents other than water. However, it may sometimes be desirable to use a substantially inert, normally liquid organic diluent in the reaction. The nature of suitable diluents will readily be apparent to those skilled in the art.

The time required for the reaction to be completed will vary depending on the reagents, ratios thereof, the reaction temperature, the presence or absence of catalysts, and the purity of the reagents. The course of the reaction is conveniently followed by monitoring the pressure in the reaction vessel; the reaction can be considered complete when the pressure levels off to a constant value.

Following the preparation of the sulfurized mixture by the procedure described hereinabove, substantially all low boiling materials are removed. The nature of these low boiling materials will vary according to the amount and type of reactants used and the reaction conditions. It will also vary to some extent according to the use to which the sulfurized product is to be put, as well as such things as odor and flammability considerations, recycling needs of reactants and by-products, and the like. Most often, the product should have a flash point above about 30° C., preferably above 70° C. and desirably above about 100° C. as determined by ASTM Procedure D93. Reference is also made to ASTM Procedures D56 and D1310.

In addition to starting materials such as the olefinic compound, the low boiling materials will often include mercaptans and monosulfides, especially when the starting olefin contains less than 9 carbon atoms, and under those circumstances it is preferred that the product contain no more than about 5% by weight of such starting materials, mercaptans and monosulfides. If these materials are gaseous at ambient pressure and temperature, they may be removed in part simply by venting the reaction vessel, and they may be recycled if desired. In the case of less volatile starting materials, it may be necessary to resort to such techniques as distillation at atmospheric pressure or vacuum distillation or stripping. Another useful method is the passage of an inert gas such as nitrogen through the mixture at a suitable temperature and pressure. Large-scale gas chromatography and molecular distillation may also be useful.

Any solids present in the reaction mixture may be conveniently removed, in most instances, by merely pouring off the liquid product. If further removal of solids is desired, such conventional techniques as filtration or centrifugation may be used.

A further optional step in the method of this invention is the treatment of the sulfurized product, obtained as described hereinabove, to reduce active sulfur. By "active sulfur" is meant sulfur in a form which can cause straining of copper and similar materials. Standard tests are available to determine sulfur activity. As an alternative to the treatment to reduce active sulfur, metal deactivators can be used in the lubricants containing the sulfurized compositions of this invention. In some instances, such as in metal working lubricants, high levels of active sulfur may be desired and it may then be preferred not to reduce active sulfur.

When active sulfur is to be reduced, any of several methods known in the art may be employed. An illustrative method is treatment with an alkali metal sulfide as described in U.S. Pat. No. 3,498,915.

Other optional treatments may be employed to improve such qualities as the odor, color and staining characteristics of the sulfurized compositions. These may include treatment with acidic clays such as Super Filtrol and filtration through fuller's earth, activated charcoal, alumina clays or the like. Such treatments are often not required when a basic catalyst is employed.

The exact chemical nature of the sulfurized compositions of this invention is not known with certainty, and it is most convenient to describe them in terms of the method for their preparation. It appears, however, that when prepared from olefins containing less than 9 and particularly less than 7 carbon atoms, they comprise principally disulfides, trisulfides and tetrasulfides. The sulfur content of these sulfurized compositions is usually about 2–60% by weight, preferably about 25–60% and most desirably about 40–50%.

The method of this invention is illustrated by the following examples. All parts and percentages are by weight.

EXAMPLE 1

Sulfur (526 parts, 16.4 moles) is charged to a jacketed high pressure reactor which is fitted with an agitator and internal cooling coils. Refrigerated brine is circulated through the coils to cool the reactor prior to the introduction of the gaseous reactants. After sealing the reactor, evacuating to about 2 torr and cooling, 920 parts (16.4 moles) of isobutene and 279 parts (8.2 moles) of hydrogen sulfide are charged to the reactor. The reactor is heated using steam in the external jacket, to a temperature of about 182° C. (360° F.) over about 1.5 hours. A maximum pressure of 1350 psig. is reached at about 168° C. (335° F.) during this heat-up. Prior to reaching the peak reaction temperature, the pressure starts to decrease and continues to decrease steadily as the gaseous reactants are consumed. After about 10 hours at a reaction temperature of about 182° C., the pressure is 310–340 psig. and the rate of pressure change is about 5–10 psig. per hour. The unreacted hydrogen sulfide and isobutene are vented to a recovery system. After the pressure in the reactor has decreased to atmospheric, the sulfurized mixture is recovered as a liquid.

The mixture is blown with nitrogen at about 100° C. (212° F.) to remove low boiling materials including unreacted isobutene, mercaptans and monosulfides. The residue after nitrogen blowing is agitated with 5% Super Filtrol and filtered, using a diatomaceous earth filter aid. The filtrate is the desired sulfurized composition which contains 42.5% sulfur.

EXAMPLE 2

151 Parts of sulfur are charged to a reactor similar to the one described in Example 1. The sulfur is heated to 160° C. and the reactor is sealed and evacuated. 77 parts of hydrogen sulfide are added slowly to the reactor over a period of about 4.5 hours. 1.6 parts of the catalyst n-butylamine is added to the reactor after about 3.8 parts of hydrogen sulfide is added. 157 parts of isobutylene are added slowly to the reactor containing the sulfur, catalyst, and about 10 parts of hydrogen sulfide in such a manner that the rates of addition of isobutylene and hydrogen sulfide are such as to maintain 10% molar excess of hydrogen sulfide until all the hydrogen sulfide is added. The addition of the remainder of isobutylene is continued until the entire 157 parts are added. The temperature is maintained in the range 160°–171° C. throughout the foregoing additions and reactions with occasional cooling being necessary. The reaction is held for 5 hours at 171° C., then unreacted hydrogen sulfide and isobutylene are vented to a recovery system until the pressure in the vessel is reduced to atmospheric. Separation of low boiling materials from the reaction crude is accomplished by nitrogen blowing, then vacuum stripping. The residue is then filtered. The filtrate is the desired sulfurized composition containing 47% sulfur, by weight.

EXAMPLES 3–22

In Examples 2–16, the general procedure of Example 1 is followed with the omission of the acidic clay treatment and with variables such as reactant ratio, reaction temperature and the composition of the reaction mixture being varied. Separation of low boiling materials in Examples 3–16 and 18–22, is effected by first blowing with nitrogen and then vacuum stripping; in Example 17, it is effected by vacuum distillation without nitrogen blowing. In those examples where water is present, the crude product is first separated from the aqueous layer and then worked up in the usual manner.

The experimental details as well as the results obtained are summarized in Table I. Percentages of reactant, mercaptans and monosulfides are determined by vapor phase chromatography.

TABLE I

| Example | Mole ratio, isobutene:sulfur: $H_2S$ | Temp., °C. | Catalyst Identity | Catalyst Amount[1] | % Reactants, mercaptans and monosulfides In crude product | % Reactants, mercaptans and monosulfides In final product | % Sulfur in product |
|---|---|---|---|---|---|---|---|
| 3 | 1:1:0.4 | 171 | None | — | 13.7 | 3.7 | 43.65 |
| 4 | 1:1:0.4 | 193 | None | — | 11.5 | 4.5 | 44.22 |
| 5 | 1:1.2:0.8 | 193 | None | — | 15.0 | 5.0 | 51.43 |
| 6 | 1:1.2:0.4 | 171 | None | — | 12.4 | 2.5 | 48.7 |
| 7 | 1:1:0.5 | 182 | $H_2O$ | 5% | 12.8 | 1.5 | — |
| 8 | 1:1:0.5 | 171 | $Na_2S$ | 0.005 mole[2] | 9.6 | 0.8 | 47.6 |

TABLE I-continued

| Example | Mole ratio, isobutene:sulfur:H₂S | Temp., °C. | Catalyst Identity | Amount[1] | % Reactants, mercaptans and monosulfides In crude product | In final product | % Sulfur in product |
|---|---|---|---|---|---|---|---|
| 9 | 1:1:0.5 | 182 | NH₄OH | 0.005 mole[3] | 9.6 | 1.4 | 47.0 |
| 10 | 1:1:0.5 | 171 | n-C₄H₃NH₂ | 0.0005 mole | 8.1 | 0.75 | 46.5 |
| 11 | 1:1:0.5 | 171 | NH₃(anhydrus) 12.3 0.005 mole | | 0.55 | 48.1 | |
| 12 | 1:0.8:0.5 | 171 | n-C₄H₉NH₂ | 0.005 mole | 19.2 | 0.2 | 44.8 |
| 13 | 1:1.2:0.5 | 171 | n-C₄H₉NH₂ | 0.005 mole | 5.22 | 1.0 | 52.5 |
| 14 | 1:1:0.5 | 171 | p-Toluene-sulfonic acid | 1% | — | — | — |
| 15 | 1:1:0.5 | 171 | P₂S₅ | 2% | — | — | — |
| 16 | 1:1:0.5 | 171 | Super Filtrol | 0.13% | — | — | — |
| 17 | 1:1:0.5 | 171 | (C₂H₅)₃N | 0.005 mole[4] | 5.8 | 0 | — |
| 18 | 1:1.5:0.5 | 171 | n-C₄H₉NH₂ | 0.005 mole | 2.0 | 0.15 | 52.3 |
| 19 | 1:1.7:0.5 | 171 | n-C₄H₉NH₂ | 0.005 mole | 2.0 | nil | 55.1 |
| 20 | 1:1.85-0.5 | 171 | n-C₄H₉NH₂ | 0.005 mole | 2.0 | nil | 56.5 |
| 21 | 1:1.6:0.5 | 171 | n-C₄H₉NH₂ | 0.005 mole | 2.0 | 0.2 | 52.9 |
| 22 | 1:1.6:0.4 | 171 | n-C₄H₉NH₂ | 0.005 mole | 2.0 | 0.2 | 53.0 |

[1]Percentages are based on weight of reactants; mole amounts are per mole of isobutene.
[2]Added as 18% aqueous solution.
[3]Added as 28% aqueous solution.
[4]Added as an approximately 30% admixture with sulfurized product from a previous run.

EXAMPLES 23-39

Various olefinic compounds are sulfurized by the method of this invention. The catalyst in each example is n-butylamine (0.34% of olefinic compound). The separation step includes vacuum distillation. The details are summarized in Table II.

TABLE II

| Example | Olefinic compound | Molar ratio[1] | Temp., °C. | % sulfur in product |
|---|---|---|---|---|
| 23 | Isobutene; 1-butene[2] | 1:1:0.5 | 171 | 46.9 |
| 24 | 1-Octene | 1:1.5:0.5 | 171 | 34.3 |
| 25 | Isobutene; 1-octene[3] | 1:1:0.5 | 171 | 44. |
| 26 | Diisobutene | 1:1.5:0.5 | 171 | 41. |
| 27 | C₁₆-C₁₈ α-olefin | 1:1.5:0.5 | 171 | 20.6 |
| 28 | Cyclohexene | 1:1:0.5 | 171 | 31.8 |
| 29 | Isobutene; 1-hexene[2] | 1:1:0.5 | 171 | 39.5 |
| 30 | Methyl oleate | 1:1.5:0.5 | 171 | 16.5 |
| 31 | α-Methylstyrene | 1:1:0.5 | 171 | 39.2 |
| 32 | Isobutene; butadiene[3] | 1:1:0.5 | 171 | 47.2 |
| 33 | Polyisobutene[4] | 1:1.5:0.5 | 171 | 2.6 |
| 34 | Triisobutene[5] | 1:1.5:0.5 | 171 | — |
| 35 | 1-Butene | 1:1:0.5 | 138-171 | 49.5 |
| 36 | Isodecyl acrylate | 1:0.5:0.5 | 171 | 13.1 |
| 37 | Diels-Alder adduct of butadiene and butyl acrylate | 1:1.5:0.5 | 171 | 25.1 |
| 38 | 2-Butene[6] | 1:1:0.5 | 171 | 48.9 |
| 39 | Turpentine | 1:1.5:0.5 | 171 | 39.2 |

[1]Olfeinic compound(s):S:H₂S.
[2]1:1 molar ratio.
[3]0.9:0.1 molar ratio.
[4]Number average molecular weight of about 1000 as determined by vapor pressure osmometry.
[5]No separation step.
[6]Cis and trans isomers As previously indicated, the sulfurized compositions of this invention are useful as additives for lubricants, in which they function primarily as oxidation inhibitors and extreme pressure and anti-wear agents. They can be employed in a variety of lubricants based on diverse oils of lubricating viscosity, including natural and synthetic lubricating oils and mixtures thereof. These lubricants include crankcase lubricating oils for spark-ignited and compression-ignited internal combustion engines, including automobile and truck engines, two-cycle engines, aviation piston engines, marine and railroad diesel engines, and the like. They can also be used in gas engines, stationary power engines and turbines and the like. Automatic transmission fluids, transaxle lubricants, gear lubricants, metal-working lubricants, hydraulic fluids and other lubricating oil and grease compositions can also benefit from the incorporation therein of the compositions of the present invention.

Natural oils include animal oils and vegetable oils (e.g., castor oil, lard oil) as well as liquid petroleum oils and solvent-treated or acid-treated mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins [e.g., polybutylenes, polypropylenes, propyleneisobutylene copolymers, chlorinated polybutylenes, poly(1-hexenes), poly(1-octenes), poly(1-decenes), etc. and mixtures thereof]; alkylbenzenes (e.g., dodecylbenzenes, tetradecylbenzenes, dinonylbenzenes, di(2-ethylhexyl)benzenes, etc.); polyphenyls (e.g., biphenyls, terphenyls, alkylated polyphenyls, etc.), alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc. constitute another class of known synthetic lubricating oils. These are exemplified by the oils prepared through polymerization of ethylene oxide or propylene oxide, the alkyl and aryl ethers of these polyoxyalkylene polymers (e.g., methyl-polyisopropylene glycol ether having an average molecular weight of 1000, diphenyl ether of polyethylene glycol having a molecular weight of 500-1000, diethyl ether of polypropylene glycol having a molecular weight of 1000-1500, etc.) or mono- and polycarboxylic esters thereof, for example, the acetic acid esters, mixed C₃-C₈ fatty acid esters, or the C₁₃ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl) silicate, tetra-(4-methyl-2-ethylhexyl) silicate, tetra-(p-tert-butylphenyl) silicate, hexa-(4-methyl-2-pentoxy)-disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decylphosphonic acid, etc.), polymeric tetrahydrofurans and the like.

Unrefined, refined and rerefined oils (and mixtures of each with each other) of the type disclosed hereinabove can be used in the lubricant compositions of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques are known to those of skill in the art such as solvent extraction, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

Generally, the lubricants of the present invention contain an amount of the sulfurized composition sufficient to improve extreme pressure properties and inhibit wear and oxidation. Normally this amount will be about 0.01–20%, preferably about 0.01–10%, of the total weight of the lubricant. In lubricating oils operated under extremely adverse conditions, such as gear lubricants, the sulfurized composition may be present in amounts up to about 20% by weight.

The invention also contemplates the use of other additives in combination with the sulfurized composition. Such additives include, for example, detergents and dispersants of the ash-producing or ashless type, corrosion-inhibiting agents, auxiliary oxidation-inhibiting agents, pour point depressing agents, auxiliary extreme pressure agents, color stabilizers and anti-foam agents.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline, phenylenediamine, phenothiazine, phenyl-$\beta$-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°–200° C.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen-containing compounds such as amine, organic hydroxy compounds such as phenols and alcohols, and/or basic inorganic materials. Examples of these "carboxylic dispersants" are described in British Pat. No. 1,306,529 and in many U.S. Pat. Nos. including the following:

| | | |
|---|---|---|
| 3,163,603 | 3,351,552 | 3,541,012 |
| 3,184,474 | 3,381,022 | 3,542,678 |
| 3,215,707 | 3,399,141 | 3,542,680 |
| 3,219,666 | 3,415,750 | 3,567,637 |
| 3,271,310 | 3,433,744 | 3,574,101 |
| 3,272,746 | 3,444,170 | 3,576,743 |
| 3,281,357 | 3,448,048 | 3,630,904 |
| 3,306,908 | 3,448,049 | 3,632,510 |
| 3,311,558 | 3,451,933 | 3,632,511 |
| 3,316,177 | 3,454,607 | 3,697,428 |
| 3,340,281 | 3,467,668 | 3,725,441 |

-continued

| | | |
|---|---|---|
| 3,341,542 | 3,501,405 | Re 26,433 |
| 3,346,493 | 3,522,179 | |

(2) Reaction products of relatively high molecular weight aliphatic or alicyclic halides with amines, preferably polyalkylene polyamines. These may be characterized as "amine dispersants" and examples thereof are described for example, in the following U.S. Pat. Nos.:

| | |
|---|---|
| 3,275,554 | 3,454,555 |
| 3,438,757 | 3,565,804 |

(3) Reaction products of alkyl phenols in which the alkyl group contains at least about 30 carbon atoms with aldehydes (especially formaldehyde) and amines (especially polyalkylene polyamines), which may be characterized as "Mannich dispersants". The materials described in the following U.S. Pat. Nos. are illustrative.

| | |
|---|---|
| 3,413,347 | 3,725,480 |
| 3,697,574 | 3,726,882 |
| 3,725,277 | |

(4) Products obtained by post-treating the carboxylic, amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. Pat. Nos.:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene) substituted acrylates. These may be characterized as "polymeric dispersants" and examples thereof are disclosed in the following U.S. Pat. Nos.

| | |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

Auxiliary extreme pressure and oxidation-inhibiting agents and corrosion-inhibiting agents are exemplified by chlorinated aliphatic hydrocarbons such as chlorinated wax; organic sulfides and polysulfides such as benzyl disulfide, bis(chlorobenzyl) disulfide, sulfurized methyl ester of oleic acid, sulfurized alkylphenol, and sulfurized terpenes; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl 4-pentylphenyl phosphite, polypropylene (molecular weight 500)-substituted phenyl phosphite and diisobutyl-substituted phenyl phosphite; metal thiocarbamates, such as zinc dioctyldithiocarbamate, and barium heptylphenyl dithiocarbamate; and Group II metal phosphorodithioates such as zinc dicyclohexylphosphorodithioate, zinc dioctylphosphorodithioate, barium di(heptylphenyl) phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

The sulfurized compositions of this invention can be added directly to the lubricant. Preferably, however, they are diluted with a substantially inert, normally liquid organic diluent such as mineral oil, naphtha, benzene, toluene or xylene to form an additive concentrate. These concentrates generally contain about 20–90% by weight of the sulfurized composition and may contain in addition, one or more of the other additives described hereinabove.

The lubricants of this invention are illustrated by the following examples. All parts are by weight.

EXAMPLE A

A lubricating composition suitable for use as a crankcase lubricant is prepared using a 10W-40 mineral lubricating oil base and, as additives: 5.41% of a polyisodecyl acrylate viscosity index improver; 4.2% of an ashless dispersant based upon the reaction product of a polyisobutenyl succinic anhydride, pentaerythritol, and polyethylene polyamine; 1.57% of an overbased calcium sulfonate detergent; 0.96% of a zinc isobutylamyl phosphorodithioate oxidation inhibitor; 40 ppm. of a silicone anti-foam agent; and 0.27% of the product of Example 12.

EXAMPLE B

A lubricating composition suitable for use as a gear lubricant is prepared using a SAE 90 base mineral oil and, as additives: 2.0% of a dialkyl phosphite derived from $C_{14-18}$ alcohols; 0.25% of a commercially available aliphatic primary amine, wherein the aliphatic groups are a mixture of tertiary alkyl radicals having 11 to 14 carbon atoms; 0.08% of a conventional anti-foam agent based upon a polymer of 2-ethylhexyl acrylate and ethyl acrylate; and 4.1% of the product of Example 6.

EXAMPLE C

A lubricating composition sutiable for use as an industrial gear lubricant is prepared using a SAE 90 base mineral lubricating oil and 4.0% of an additive concentrate. The additive concentrate is mineral oil-based and comprises the following additives: 2% of a mixture of sulfurized esters of fatty acids and lard oil; 0.5% of a dialkyl phosphite derived from long chain alcohols; 0.02% of a conventional anti-foam agent based upon a polymer of 2-ethylhexyl acrylate and ethyl acrylate; and 1.25% of the product of Example 11.

EXAMPLE D

A lubricating composition suitable for use as a crankcase lubricant is prepared using a 10W-30 mineral lubricating oil base and, as additives: 5.00% of a styrene-maleic anhydride copolymer, partially esterified with $C_4$–$C_{18}$ alcohols and neutralized with $C_{11}$–$C_{14}$ t-alkyl primary amine mixture, as a viscosity index improver; 1.77% of a propylene oxide-treated sulfurized overbased calcium phenate detergent; 0.46% of an overbased magnesium sulfonate detergent; 3.81% of an ashless dispersant based upon the reaction product of a polyisobutenyl succinic anhydride, pentaerythritol and polyethylene polyamine; 0.20% of a commercially available copper deactivator; 1.66% of an ashless dispersant based upon the reaction product of a polyisobutenyl succinic anhydride, polyethylene polyamine and boric acid; 0.35% of an alkenylated succinic acid wherein the alkenyl group is derived from a propylene tetramer; 0.21% of a diluent mineral oil; 0.01% of a silicone anti-foam agent; and 2.00% of the product of Example 24.

EXAMPLE E

A lubricating composition suitable for use as an industrial gear lubricant is prepared using a SAE 90 base mineral oil and, as additives: 2.29% of a mixture of sulfur-treated esters of fatty acids and lard oil; 0.05% of a commercially available aliphatic propylene diamine, wherein the aliphatic group is derived from tallow; 0.005% of a commercially available demulsifier; 0.042% of an alkenylated succinic anhydride wherein the alkenyl group is derived from a propylene tetramer; 0.28% of a product formed by reacting a mixture of mono- and dialkyl phosphoric acids with a $C_{11}$–$C_{14}$ t-alkyl primary amine mixture; 0.10% diluent mineral oil; 0.023% of an anti-foam agent based upon a polymer of 2-ethylhexyl acrylate and ethyl acrylate; and 1.21% of the product of Example 26.

EXAMPLE F

A lubricating composition suitable for use as a gear lubricant is prepared using a SAE 90 base mineral oil and, as additives: 1.32% of a product formed by reacting a mixture of mono- and dialkyl phosphoric acids with a $C_{11}$–$C_{14}$ t-alkyl primary amine mixture; 0.35% of oleylamine; 0.10% of a mixture of oleamide and linoleamide; 0.07% diluent mineral oil; 0.15% of a copper deactivator; 0.08% of an anti-foam agent based upon a polymer of 2-ethylhexyl acrylate and ethyl acrylate; and 9.20% of the product of Example 27.

EXAMPLE G

A lubricating composition suitable for use as an industrial lubricant is prepared using tap water, and as additives: 5.03% of a 100 N lubricating oil; 0.27% of fatty acids; 0.23% of a naphthenic oil; 0.13% of a polyisobutenyl succinic anhydride; 0.12% of a $C_4$–$C_5$ alcohol mixture; 0.08% of a 45% aqueous potassium hydroxide solution; 0.04% of isopropanolamine; and 0.35% of the product of Example 26.

EXAMPLE H

A lubricating composition similar to that of Example E is prepared except that 2.23% of the product of Example 29 is substituted for the product of Example 26.

EXAMPLE I

A lubricating composition similar to that of Example F is prepared except that 2.45% of the product of Example 31 is substituted for the product of Example 27.

EXAMPLE J

A lubricating composition similar to that of Example E is prepared except that 1.87% of the product of Example 30 is substituted for the product of Example 26.

EXAMPLE K

A lubricating composition similar to that of Example F is prepared except that 9.20% of the product of Example 36 is substituted for the product of Example 27.

EXAMPLE L

A lubricating composition similar to that of Example D is prepared except that 2.00% of the product of Example 37 is substituted for the product of Example 24.

EXAMPLE M

A lubricating composition similar to that of Example D is prepared except that 2% of the product of Example 2 is substituted for the product of Example 24.

What is claimed is:

1. A method for the preparation of a sulfurized composition which comprises the steps of reacting at about 50°–300° C., under superatomspheric pressure and in the presence of a catalyst, sulfur and hydrogen sulfide with at least one olefinic compound containing 3 to about 30 carbon atoms to form a sulfurized mixture; about 1.2–3.0 gram-atoms of sulfur and about 0.1–1.5 moles of hydrogen sulfide being used per mole of olefinic compound; and removing from said sulfurized mixture substantially all low boiling materials including unreacted olefin, mercaptan and monosulfide.

2. The method according to claim 1 wherein the reaction temperature is about 100°–200° C.

3. The method according to claim 2 wherein about 1.2–2.0 gram-atoms of sulfur and about 0.2–1.25 moles of hydrogen sulfide are used per mole of the olefinic compound.

4. The method according to claim 3 wherein about 0.4–0.8 mole of hydrogen sulfide is used per mole of the olefinic compound.

5. The method according to claim 4 wherein the olefinic compound is an olefinic hydrocarbon containing from 3 to about 16 carbon atoms.

6. The method according to claim 5 wherein the catalyst is a basic catalyst and at least about 0.0005 mole thereof is used per mole of olefin.

7. The method according to claim 6 wherein about 0.001–0.1 mole of catalyst is used per mole of olefin.

8. The method according to claim 7 wherein at least one of the olefinic compounds has one or two carbon-to-carbon double bonds.

9. The method according to claim 8 wherein the olefin is a monoolefin selected from propene, isobutene and dimers, trimers and tetramers thereof.

10. The method according to claim 9 wherein the olefin is isobutene or diisobutene.

11. The method for the preparation of a sulfurized composition which comprises the steps of reacting at about 50°–300° C., under superatmospheric pressure and in the presence of a catalyst, sulfur and hydrogen sulfide with at least one terminal aliphatic monoolefin containing less than 9 carbon atoms to form a sulfurized mixture, about 1.2–2.0 gram-atoms of sulfur and about 0.1–1.5 moles of hydrogen sulfide being used per mole of monoolefin; and removing from said sulfurized mixture substantially all low boiling materials including unreacted monoolefin, mercaptan and monosulfide.

12. The method according to claim 11 wherein the reaction temperature is about 100°–200° C. and about 0.2–1.0 mole of hydrogen sulfide is used per mole of monoolefin.

13. The method according to claim 12 wherein the monoolefin is isobutene.

14. The method according to claim 13 wherein the catalyst is a basic catalyst and at least about 0.0005 mole thereof is used per mole of isobutene.

15. The method according to claim 14 wherein about 0.001–0.1 mole of catalyst is used per mole of isobutene.

16. The method according to claim 14 wherein the catalyst is ammonia.

17. The method according to claim 14 wherein the catalyst is an amine.

18. The method according to claim 12 wherein about 1.2–1.5 gram-atoms of sulfur and about 0.4–0.8 mole of hydrogen sulfide are used per mole of the monoolefin.

19. The method according to claim 1 which includes the step of treating the product after removal of low boiling materials with an alkali metal sulfide to reduce active sulfur.

20. The method according to claim 19 wherein the olefinic compound is a monoolefinic hydrocarbon containing from 3 to about 16 carbon atoms.

21. The method according to claim 20 wherein the olefin is at least one of propene, isobutene and dimers, trimers and tetramers thereof.

22. The method according to claim 21 wherein the olefin is isobutene or diisobutene.

23. The method according to claim 11 which includes the step of treating the product after removal of low boiling materials with an alkali metal sulfide to reduce active sulfur.

24. The method according to claim 23 wherein the olefin is isobutene.

25. The sulfurized composition prepared by the method of claim 1.

26. The sulfurized composition prepared by the method of claim 3.

27. The sulfurized composition prepared by the method of claim 5.

28. The sulfurized composition prepared by the method of claim 9.

29. The sulfurized composition prepared by the method of claim 10.

30. The sulfurized composition prepared by the method of claim 11.

31. The sulfurized composition prepared by the method of claim 13.

32. An additive concentrate comprising a substantially inert, normally liquid diluent and about 20–90% by weight of the sulfurized composition of claim 25.

33. An additive concentrate comprising a substantially inert, normally liquid diluent and about 20–90% by weight of the sulfurized composition of claim 26.

34. An additive concentrate comprising a substantially inert, normally liquid diluent and about 20–90% by weight of the sulfurized composition of claim 27.

35. An additive concentrate comprising a substantially inert, normally liquid diluent and about 20–90% by weight of the sulfurized composition of claim 28.

36. An additive concentrate comprising a substantially inert, normally liquid diluent and about 20–90% by weight of the sulfurized composition of claim 29.

37. An additive concentrate comprising a substantially inert, normally liquid diluent and about 20–90% by weight of the sulfurized composition of claim 30.

38. An additive concentrate comprising a substantially inert, normally liquid diluent and about 20–90% by weight of the sulfurized composition of claim 31.

39. A lubricating composition comprising a major proportion of lubricating oil and a minor proportion, sufficient to improve extreme pressure, anti-wear or oxidation inhibiting properties, of a sulfurized composition according to claim 25.

40. A lubricating composition comprising a major proportion of lubricating oil and a minor proportion, sufficient to improve extreme pressure, anti-wear or oxidation inhibiting properties, of a sulfurized composition according to claim 26.

41. A lubricating composition comprising a major proportion of lubricating oil and a minor proportion, sufficient to improve extreme pressure, anti-wear or oxidation inhibiting properties, of a sulfurized composition according to claim 27.

42. A lubricating composition comprising a major proportion of lubricating oil and a minor proportion, sufficient to improve extreme pressure, anti-wear or oxidation inhibiting properties, of a sulfurized composition according to claim 28.

43. A lubricating composition comprising a major proportion of lubricating oil and a minor proportion, sufficient to improve extreme pressure, anti-wear or oxidation inhibiting properties, of a sulfurized composition according to claim 29.

44. A lubricating composition comprising a major proportion of a lubricating oil and a minor proportion, sufficient to improve extreme pressure, anti-wear or oxidation inhibiting properties and comprising about 0.1–10% by weight of said lubricating composition, of a sulfurized composition according to claim 30.

45. A lubricating composition comprising a major proportion of a lubricating oil and a minor proportion, sufficient to improve extreme pressure, anti-wear or oxidation inhibiting properties and comprising about 0.1–10% by weight of said lubricating composition, of a sulfurized composition according to claim 31.

* * * * *

UNITED STATES PATENT AND TRADEMARK OFFICE
CERTIFICATE OF CORRECTION

PATENT NO. : 4,191,659
DATED : March 4, 1980
INVENTOR(S) : Kirk Emerson Davis

It is certified that error appears in the above-identified patent and that said Letters Patent are hereby corrected as shown below:

Column 5, line 8, "straining" should read --staining--.

Signed and Sealed this

Thirtieth Day of September 1980

[SEAL]

Attest:

SIDNEY A. DIAMOND

Attesting Officer

Commissioner of Patents and Trademarks